(12) United States Patent
Khare et al.

(10) Patent No.: US 12,335,851 B2
(45) Date of Patent: Jun. 17, 2025

(54) APPARATUS, METHOD, AND COMPUTER PROGRAM

(71) Applicant: Nokia Technologies Oy, Espoo (FI)

(72) Inventors: Saurabh Khare, Bangalore (IN); Bruno Landais, Pleumeur-Bodou (FR); Anja Jerichow, Grafing bei München (DE)

(73) Assignee: Nokia Technologies Oy, Espoo (FI)

( * ) Notice: Subject to any disclaimer, the term of this patent is extended or adjusted under 35 U.S.C. 154(b) by 256 days.

(21) Appl. No.: 17/817,489

(22) Filed: Aug. 4, 2022

(65) Prior Publication Data
US 2023/0052658 A1    Feb. 16, 2023

(30) Foreign Application Priority Data

Aug. 7, 2021   (IN) .............................. 202141035715

(51) Int. Cl.
H04W 48/16    (2009.01)
H04W 84/04    (2009.01)
H04W 92/24    (2009.01)

(52) U.S. Cl.
CPC .......... *H04W 48/16* (2013.01); *H04W 84/042* (2013.01); *H04W 92/24* (2013.01)

(58) Field of Classification Search
CPC .... H04W 48/16; H04W 84/042; H04W 92/24
See application file for complete search history.

(56) References Cited

U.S. PATENT DOCUMENTS

2023/0388273 A1* 11/2023 Rajput ................. H04L 63/166

OTHER PUBLICATIONS

Extended European Search Report received for corresponding European Patent Application No. 22188989.2, dated Jan. 5, 2023, 7 pages.
"PLMN ID handling over N32", 3GPP TSG-CT4 Meeting #101-e, C4-205820, Huawei, Nov. 3-13, 2020, 7 pages.
"Clarification on the number of PLMN IDuse by SEPP over N32", 3GPP TSG-SA3 Meeting #103-e, S3-212287, Vodafone, May 17-28, 2021, 2 pages.
"3rd Generation Partnership Project; Technical Specification Group Core Network and Terminals; 5G System; Network Function Repository Services; Stage 3 (Release 17)", 3GPP TS 29.510, V17.2.0, Jun. 2021, pp. 1-256.
"PLMN Specific N32-C connection", 3GPP TSG-CT WG4 Meeting #105-e, C4-21xxxx, Nokia, Aug. 17-27, 2021, 6 pages.
(Continued)

*Primary Examiner* — Diane D Mizrahi
(74) *Attorney, Agent, or Firm* — Nokia Technologies Oy

(57) ABSTRACT

The disclosure relates to a first apparatus comprising at least one processor and at least one memory including computer code for one or more programs, the at least one memory and the computer code configured, with the at least one processor, to cause the apparatus at least to: send (500), to a second apparatus, a request comprising information indicating a list of public land mobile network identifiers identifying a first public land mobile network supported by the first apparatus, and information to derive a second public land mobile network supported by the second apparatus; and receive (502), from the second apparatus, a response comprising information indicating a list of public land mobile network identifiers identifying the second public land mobile network supported by the second apparatus.

17 Claims, 7 Drawing Sheets

---

600 Responding SEPP may receive, from an initiating SEPP, a request comprising information indicating a list of PLMN IDs identifying a first PLMN supported by the initiating SEPP, and information to derive a second PLMN supported by the responding SEPP

602 Responding SEPP may derive the second PLMN supported by the responding SEPP

604 Responding SEPP may send, to the initiating SEPP, a response comprising information indicating a list of PLMN IDs identifying the second PLMN supported by the second apparatus

(56) References Cited

OTHER PUBLICATIONS

"3rd Generation Partnership Project; Technical Specification Group Services and System Aspects; Security architecture and procedures for 5G system (Release 17)", 3GPP TS 33.501, V17.2.1, Jun. 2021, pp. 1-257.

"3rd Generation Partnership Project; Technical Specification Group Core Network and Terminals; 5G System; Public Land Mobile Network (PLMN) Interconnection; Stage 3 (Release 17)", 3GPP TS 29.573, V17.1.0, Jun. 2021, pp. 1-102.

\* cited by examiner

APPARATUS, METHOD, AND COMPUTER PROGRAM

FIELD OF THE DISCLOSURE

The present disclosure relates to an apparatus, a method, and a computer program for communicating between a first apparatus (e.g. initiating security edge protection proxy) and a second apparatus (e.g. responding security edge protection proxy) in a communication system (e.g. 5G system).

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards such as those provided by 3GPP, satellite based communication systems and different wireless local networks, for example wireless local area networks (WLAN). The wireless systems can typically be divided into cells, and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined. Examples of standard are the so-called 5G standards.

SUMMARY

According to an aspect there is provided an apparatus comprising means for: sending, to a second apparatus, a request comprising information indicating a list of public land mobile network identifiers identifying a first public land mobile network supported by the first apparatus, and information to derive a second public land mobile network supported by the second apparatus; and receiving, from the second apparatus, a response comprising information indicating a list of public land mobile network identifiers identifying the second public land mobile network supported by the second apparatus.

The information to derive the second public land mobile network supported by the second apparatus may comprise a public land mobile network identifier identifying the second public land mobile network supported by the second apparatus.

The information to derive the second public land mobile network supported by the second apparatus may be conveyed via an information element in the request.

The information element may b e a SecNegotiateReqData information element.

The information to derive the second public land mobile network supported by the second apparatus may be conveyed a fully qualified domain name associated with the second public land mobile network supported by the second apparatus.

The information indicating the list of public land mobile network identifiers identifying the second public land mobile network supported by the second apparatus may be conveyed via an information element in the response.

The information element may be a SecNegotiateRespData information element.

The first apparatus may support a first plurality of public land mobile networks comprising the first public land mobile network and the second apparatus may support a second plurality of public land mobile networks comprising the second public land mobile network.

The first apparatus may comprise means for: establishing a connection between the first public land mobile network supported by the first apparatus and the second public land mobile network supported by the second apparatus separate from another connection between another first public land mobile network supported by the first apparatus and another second public land mobile network supported by the second apparatus and/or separate from another connection between another first public land mobile network supported by the first apparatus and the second public land mobile network supported by the second apparatus.

The first apparatus may be an initiating security edge protection proxy and the second apparatus may be a responding security edge protection proxy.

The connection between the first apparatus and the second apparatus may be a signalling connection to exchange security and protection policies, to be used for the forwarding of service requests and responses between the first public land mobile network and the second public land mobile network.

According to an aspect there is provided an apparatus comprising at least one processor and at least one memory including computer code for one or more programs, the at least one memory and the computer code configured, with the at least one processor, to cause the apparatus at least to: send, to a second apparatus, a request comprising information indicating a list of public land mobile network identifiers identifying a first public land mobile network supported by the first apparatus, and information to derive a second public land mobile network supported by the second apparatus; and receive, from the second apparatus, a response comprising information indicating a list of public land mobile network identifiers identifying the second public land mobile network supported by the second apparatus.

The information to derive the second public land mobile network supported by the second apparatus may comprise a public land mobile network identifier identifying the second public land mobile network supported by the second apparatus.

The information to derive the second public land mobile network supported by the second apparatus may be conveyed via an information element in the request.

The information element may b e a SecNegotiateReqData information element.

The information to derive the second public land mobile network supported by the second apparatus may be conveyed a fully qualified domain name associated with the second public land mobile network supported by the second apparatus.

The information indicating the list of public land mobile network identifiers identifying the second public land mobile network supported by the second apparatus may be conveyed via an information element in the response.

The information element may be a SecNegotiateRespData information element.

The first apparatus may support a first plurality of public land mobile networks comprising the first public land mobile network and the second apparatus may support a second plurality of public land mobile networks comprising the second public land mobile network.

The at least one memory and the computer code may be configured, with the at least one processor, to cause the first apparatus at least to: establish a connection between the first public land mobile network supported by the first apparatus and the second public land mobile network supported by the second apparatus separate from another connection between another first public land mobile network supported by the first apparatus and another second public land mobile network supported by the second apparatus and/or separate from another connection between another first public land mobile network supported by the first apparatus and the second public land mobile network supported by the second apparatus.

The first apparatus may be an initiating security edge protection proxy and the second apparatus may be a responding security edge protection proxy.

The connection between the first apparatus and the second apparatus may be a signalling connection to exchange security and protection policies, to be used for the forwarding of service requests and responses between the first public land mobile network and the second public land mobile network.

According to an aspect there is provided an apparatus comprising circuitry configured to: send, to a second apparatus, a request comprising information indicating a list of public land mobile network identifiers identifying a first public land mobile network supported by the first apparatus, and information to derive a second public land mobile network supported by the second apparatus; and receive, from the second apparatus, a response comprising information indicating a list of public land mobile network identifiers identifying the second public land mobile network supported by the second apparatus.

The information to derive the second public land mobile network supported by the second apparatus may comprise a public land mobile network identifier identifying the second public land mobile network supported by the second apparatus.

The information to derive the second public land mobile network supported by the second apparatus may be conveyed via an information element in the request.

The information element may be a SecNegotiateReqData information element.

The information to derive the second public land mobile network supported by the second apparatus may be conveyed a fully qualified domain name associated with the second public land mobile network supported by the second apparatus.

The information indicating the list of public land mobile network identifiers identifying the second public land mobile network supported by the second apparatus may be conveyed via an information element in the response.

The information element may be a SecNegotiateRespData information element.

The first apparatus may support a first plurality of public land mobile networks comprising the first public land mobile network and the second apparatus may support a second plurality of public land mobile networks comprising the second public land mobile network.

The first apparatus may comprise circuitry configured to: establish a connection between the first public land mobile network supported by the first apparatus and the second public land mobile network supported by the second apparatus separate from another connection between another first public land mobile network supported by the first apparatus and another second public land mobile network supported by the second apparatus and/or separate from another connection between another first public land mobile network supported by the first apparatus and the second public land mobile network supported by the second apparatus.

The first apparatus may be an initiating security edge protection proxy and the second apparatus may be a responding security edge protection proxy.

The connection between the first apparatus and the second apparatus may be a signalling connection to exchange security and protection policies, to be used for the forwarding of service requests and responses between the first public land mobile network and the second public land mobile network.

According to an aspect there is provided a method comprising: sending, to a second apparatus, a request comprising information indicating a list of public land mobile network identifiers identifying a first public land mobile network supported by a first apparatus, and information to derive a second public land mobile network supported by the second apparatus; and receiving, from the second apparatus, a response comprising information indicating a list of public land mobile network identifiers identifying the second public land mobile network supported by the second apparatus.

The information to derive the second public land mobile network supported by the second apparatus may comprise a public land mobile network identifier identifying the second public land mobile network supported by the second apparatus.

The information to derive the second public land mobile network supported by the second apparatus may be conveyed via an information element in the request.

The information element may b e a SecNegotiateReqData information element.

The information to derive the second public land mobile network supported by the second apparatus may be conveyed a fully qualified domain name associated with the second public land mobile network supported by the second apparatus.

The information indicating the list of public land mobile network identifiers identifying the second public land mobile network supported by the second apparatus may be conveyed via an information element in the response.

The information element may be a SecNegotiateRespData information element.

The first apparatus may support a first plurality of public land mobile networks comprising the first public land mobile network and the second apparatus may support a second plurality of public land mobile networks comprising the second public land mobile network.

The method may comprise: establishing a connection between the first public land mobile network supported by the first apparatus and the second public land mobile network supported by the second apparatus separate from another connection between another first public land mobile network supported by the first apparatus and another second public land mobile network supported by the second apparatus and/or separate from another connection between another first public land mobile network supported by the first apparatus and the second public land mobile network supported by the second apparatus.

The first apparatus may be initiating security edge protection proxy and the second apparatus may be a responding security edge protection proxy.

The connection between the first apparatus and the second apparatus may be a signalling connection to exchange security and protection policies, to be used for the forwarding of service requests and responses between the first public land mobile network and the second public land mobile network.

According to an aspect there is provided a computer program comprising computer executable code which when run on at least one processor is configured to: send, to a second apparatus, a request comprising information indicating a list of public land mobile network identifiers identifying a first public land mobile network supported by a first apparatus, and information to derive a second public land mobile network supported by the second apparatus; and receive, from the second apparatus, a response comprising information indicating a list of public land mobile network identifiers identifying the second public land mobile network supported by the second apparatus.

The information to derive the second public land mobile network supported by the second apparatus may comprise a public land mobile network identifier identifying the second public land mobile network supported by the second apparatus.

The information to derive the second public land mobile network supported by the second apparatus may be conveyed via an information element in the request.

The information element may b e a SecNegotiateReqData information element.

The information to derive the second public land mobile network supported by the second apparatus may be conveyed a fully qualified domain name associated with the second public land mobile network supported by the second apparatus.

The information indicating the list of public land mobile network identifiers identifying the second public land mobile network supported by the second apparatus may be conveyed via an information element in the response.

The information element may be a SecNegotiateRespData information element.

The first apparatus may support a first plurality of public land mobile networks comprising the first public land mobile network and the second apparatus may support a second plurality of public land mobile networks comprising the second public land mobile network.

The computer program may comprise computer executable code which when run on at least one processor is configured to: establish a connection between the first public land mobile network supported by the first apparatus and the second public land mobile network supported by the second apparatus separate from another connection between another first public land mobile network supported by the first apparatus and another second public land mobile network supported by the second apparatus and/or separate from another connection between another first public land mobile network supported by the first apparatus and the second public land mobile network supported by the second apparatus.

The first apparatus may be an initiating security edge protection proxy and the second apparatus may be a responding security edge protection proxy.

The connection between the first apparatus and the second apparatus may be a signalling connection to exchange security and protection policies, to be used for the forwarding of service requests and responses between the first public land mobile network and the second public land mobile network.

According to an aspect there is provided an apparatus comprising means for: receiving, from a first apparatus, a request comprising information indicating a list of public land mobile network identifiers identifying a first public land mobile network supported by the first apparatus, and information to derive a second public land mobile network supported by the second apparatus; deriving the second public land mobile network supported by the second apparatus; and sending, to the first apparatus, a response comprising information indicating a list of public land mobile network identifiers identifying the second public land mobile network supported by the second apparatus.

The information to derive the second public land mobile network supported by the second apparatus may comprise a public land mobile network identifier identifying the second public land mobile network supported by the second apparatus.

The information to derive the second public land mobile network supported by the second apparatus may be conveyed via an information element in the request.

The information element may be a SecNegotiateReqData information element.

The information indicating the second public land mobile network supported by the second apparatus may comprise a fully qualified domain name associated with the second public land mobile network supported by the second apparatus.

The information indicating the list of public land mobile network identifiers identifying the second public land mobile network supported by the second apparatus may be conveyed via an information element in the response.

The information element may be a SecNegotiateRespData information element.

The first apparatus may support a first plurality of public land mobile networks comprising the first public land mobile network and the second apparatus may support a second plurality of public land mobile networks comprising the second public land mobile network.

The apparatus may means for: establishing a connection between the first public land mobile network supported by the first apparatus and the second public land mobile network supported by the second apparatus separate from another connection between the first public land mobile network supported by the first apparatus and another second public land mobile network supported by the second apparatus and/or separate from another connection between another first public land mobile network supported by the first apparatus and the second public land mobile network supported by the second apparatus.

The first apparatus may be an initiating security edge protection proxy and the second apparatus may be a responding security edge protection proxy.

The connection between the first apparatus and the second apparatus may be a signalling connection to exchange security and protection policies, to be used for the forwarding of service requests and responses between the first public land mobile network and the second public land mobile network.

According to an aspect there is provided an apparatus comprising at least one processor and at least one memory including computer code for one or more programs, the at least one memory and the computer code configured, with the at least one processor, to cause the apparatus at least to: receive, from a first apparatus, a request comprising information indicating a list of public land mobile network identifiers identifying a first public land mobile network supported by the first apparatus, and information to derive a second public land mobile network supported by the second apparatus; derive the second public land mobile network supported by the second apparatus; and send, to the first apparatus, a response comprising information indicating a list of public land mobile network identifiers identifying the second public land mobile network supported by the second apparatus.

The information to derive the second public land mobile network supported by the second apparatus may comprise a public land mobile network identifier identifying the second public land mobile network supported by the second apparatus.

The information to derive the second public land mobile network supported by the second apparatus may be conveyed via an information element in the request.

The information element may be a SecNegotiateReqData information element.

The information indicating the second public land mobile network supported by the second apparatus may comprise a fully qualified domain name associated with the second public land mobile network supported by the second apparatus.

The information indicating the list of public land mobile network identifiers identifying the second public land mobile network supported by the second apparatus may be conveyed via an information element in the response.

The information element may be a SecNegotiateRespData information element.

The first apparatus may support a first plurality of public land mobile networks comprising the first public land mobile network and the second apparatus may support a second plurality of public land mobile networks comprising the second public land mobile network.

The at least one memory and the computer code may be configured, with the at least one processor, to cause the first apparatus at least to: establish a connection between the first public land mobile network supported by the first apparatus and the second public land mobile network supported by the second apparatus separate from another connection between the first public land mobile network supported by the first apparatus and another second public land mobile network supported by the second apparatus and/or separate from another connection between another first public land mobile network supported by the first apparatus and the second public land mobile network supported by the second apparatus.

The first apparatus may be an initiating security edge protection proxy and the second apparatus may be a responding security edge protection proxy.

The connection between the first apparatus and the second apparatus may be a signalling connection to exchange security and protection policies, to be used for the forwarding of service requests and responses between the first public land mobile network and the second public land mobile network.

According to an aspect there is provided an apparatus comprising circuitry configured to: receive, from a first apparatus, a request comprising information indicating a list of public land mobile network identifiers identifying a first public land mobile network supported by the first apparatus, and information to derive a second public land mobile network supported by the second apparatus; derive the second public land mobile network supported by the second apparatus; and send, to the first apparatus, a response comprising information indicating a list of public land mobile network identifiers identifying the second public land mobile network supported by the second apparatus.

The information to derive the second public land mobile network supported by the second apparatus may comprise a public land mobile network identifier identifying the second public land mobile network supported by the second apparatus.

The information to derive the second public land mobile network supported by the second apparatus may be conveyed via an information element in the request.

The information element may be a SecNegotiateReqData information element.

The information indicating the second public land mobile network supported by the second apparatus may comprise a fully qualified domain name associated with the second public land mobile network supported by the second apparatus.

The information indicating the list of public land mobile network identifiers identifying the second public land mobile network supported by the second apparatus may be conveyed via an information element in the response.

The information element may be a SecNegotiateRespData information element.

The first apparatus may support a first plurality of public land mobile networks comprising the first public land mobile network and the second apparatus may support a second plurality of public land mobile networks comprising the second public land mobile network.

The apparatus may comprise circuitry configured to: establish a connection between the first public land mobile network supported by the first apparatus and the second public land mobile network supported by the second apparatus separate from another connection between the first public land mobile network supported by the first apparatus and another second public land mobile network supported by the second apparatus and/or separate from another connection between another first public land mobile network supported by the first apparatus and the second public land mobile network supported by the second apparatus.

The first apparatus may be an initiating security edge protection proxy and the second apparatus may be a responding security edge protection proxy.

The connection between the first apparatus and the second apparatus may be a signalling connection to exchange security and protection policies, to be used for the forwarding of service requests and responses between the first public land mobile network and the second public land mobile network.

According to an aspect there is provided a method comprising: receiving, from a first apparatus, a request comprising information indicating a list of public land mobile network identifiers identifying a first public land mobile network supported by the first apparatus, and information to derive a second public land mobile network supported by a second apparatus; deriving the second public land mobile network supported by the second apparatus; and sending, to the first apparatus, a response comprising information indicating a list of public land mobile network identifiers identifying the second public land mobile network supported by the second apparatus.

The information to derive the second public land mobile network supported by the second apparatus may comprise a public land mobile network identifier identifying the second public land mobile network supported by the second apparatus.

The information to derive the second public land mobile network supported by the second apparatus may be conveyed via an information element in the request.

The information element may be a SecNegotiateReqData information element.

The information indicating the second public land mobile network supported by the second apparatus may comprise a fully qualified domain name associated with the second public land mobile network supported by the second apparatus.

The information indicating the list of public land mobile network identifiers identifying the second public land mobile network supported by the second apparatus may be conveyed via an information element in the response.

The information element may be a SecNegotiateRespData information element.

The first apparatus may support a first plurality of public land mobile networks comprising the first public land mobile network and the second apparatus may support a second plurality of public land mobile networks comprising the second public land mobile network.

The method may comprise: establishing a connection between the first public land mobile network supported by the first apparatus and the second public land mobile network supported by the second apparatus separate from another connection between the first public land mobile network supported by the first apparatus and another second public land mobile network supported by the second apparatus and/or separate from another connection between another first public land mobile network supported by the first apparatus and the second public land mobile network supported by the second apparatus.

The first apparatus may be an initiating security edge protection proxy and the second apparatus may be a responding security edge protection proxy.

The connection between the first apparatus and the second apparatus may be a signalling connection to exchange security and protection policies, to be used for the forwarding of service requests and responses between the first public land mobile network and the second public land mobile network.

According to an aspect there is provided a computer program comprising computer executable code which when run on at least one processor is configured to: receive, from a first apparatus, a request comprising information indicating a list of public land mobile network identifiers identifying a first public land mobile network supported by the first apparatus, and information to derive a second public land mobile network supported by a second apparatus; derive the second public land mobile network supported by the second apparatus; and send, to the first apparatus, a response comprising information indicating a list of public land mobile network identifiers identifying the second public land mobile network supported by the second apparatus.

The information to derive the second public land mobile network supported by the second apparatus may comprise a public land mobile network identifier identifying the second public land mobile network supported by the second apparatus.

The information to derive the second public land mobile network supported by the second apparatus may be conveyed via an information element in the request.

The information element may be a SecNegotiateReqData information element.

The information indicating the second public land mobile network supported by the second apparatus may comprise a fully qualified domain name associated with the second public land mobile network supported by the second apparatus.

The information indicating the list of public land mobile network identifiers identifying the second public land mobile network supported by the second apparatus may be conveyed via an information element in the response.

The information element may be a SecNegotiateRespData information element.

The first apparatus may support a first plurality of public land mobile networks comprising the first public land mobile network and the second apparatus may support a second plurality of public land mobile networks comprising the second public land mobile network.

The computer program comprising computer executable code which when run on at least one processor may be configured to: establish a connection between the first public land mobile network supported by the first apparatus and the second public land mobile network supported by the second apparatus separate from another connection between the first public land mobile network supported by the first apparatus and another second public land mobile network supported by the second apparatus and/or separate from another connection between another first public land mobile network supported by the first apparatus and the second public land mobile network supported by the second apparatus.

The first apparatus may be an initiating security edge protection proxy and the second apparatus may be a responding security edge protection proxy.

The connection between the first apparatus and the second apparatus may be a signalling connection to exchange security and protection policies, to be used for the forwarding of service requests and responses between the first public land mobile network and the second public land mobile network.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

LIST OF ABBREVIATIONS

AF: Application Function
AMF: Access and Mobility Management Function
API: Application Protocol Interface
BS: Base Station
CU: Centralized Unit
DL: Downlink
DU: Distributed Unit
FQDN: Fully Qualified Domain Name
gNB: gNodeB
GSM: Global System for Mobile communication
HSS: Home Subscriber Server
ID: Identifier
IE: Information Element
IoT: Internet of Things
LTE: Long Term Evolution
MAC: Medium Access Control
MS: Mobile Station MTC: Machine Type Communication
NEF: Network Exposure Function
NF: Network Function
NR: New radio
NRF: Network function Repository Function
PDU: Packet Data Unit
PLMN: Public Land Mobile Network Interconnected Security
PRINS: PRotocol for N32
RAM: Random Access Memory
(R)AN: (Radio) Access Network
ROM: Read Only Memory
SMF: Session Management Function
SEPP: Security Edge Protection Proxy
TLS: Transport Layer Security
TR: Technical Report
TS: Technical Specification
UE: User Equipment
UMTS: Universal Mobile Telecommunication System
URI: Uniform Resource Indicator
3GPP: $3^{rd}$ Generation Partnership Project
5G: $5^{th}$ Generation
5GC: 5G Core network
5GS: 5G System

BRIEF DESCRIPTION OF THE FIGURES

Embodiments will now be described, by way of example only, with reference to the accompanying Figures in which.

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
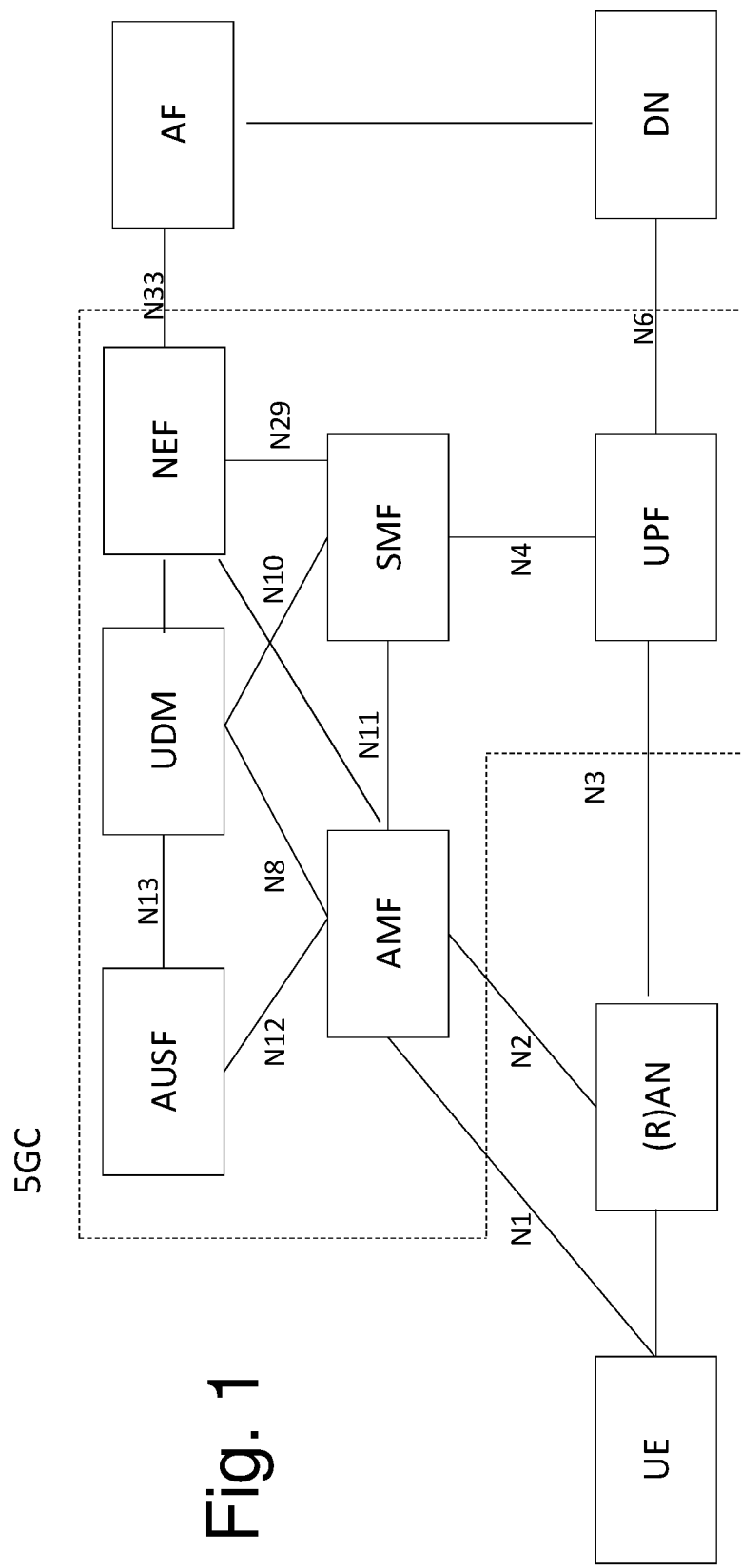
FIG. 1 shows a schematic representation of a 5G system.

FIG. 1 shows a schematic representation of a 5G system (5GS). The 5GS may comprises a terminal, a (radio) access network ((R)AN), a 5G core network (5GC), one or more application functions (AF) and one or more data networks (DN).

The 5G (R)AN may comprise one or more gNodeB (gNB) distributed unit functions connected to one or more gNodeB (gNB) centralized unit functions.

The 5GC may comprise an access and mobility management function (AMF), a session management function (SMF), an authentication server function (AUSF), a user data management (UDM), a user plane function (UPF) and/or a network exposure function (NEF). The 5GC may comprise other network functions (NF), such as a security edge protection proxy (SEPP) (not illustrated).

Figure 2:
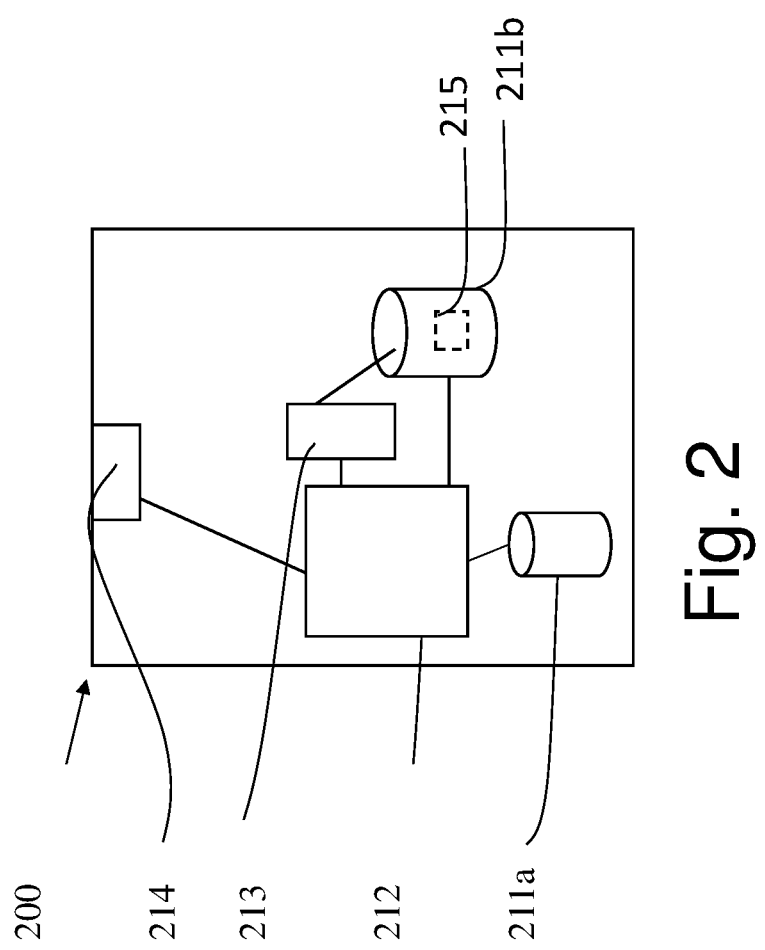
FIG. 2 shows a schematic representation of a control apparatus.

FIG. 2 illustrates an example of a control apparatus 200 for controlling a function of the (R)AN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5G (R)AN or the 5GC. In some embodiments, each function of the (R)AN or the 5GC comprises a control apparatus 200. In alternative embodiments, two or more functions of the (R)AN or the 5GC may share a control apparatus.

Figure 3:
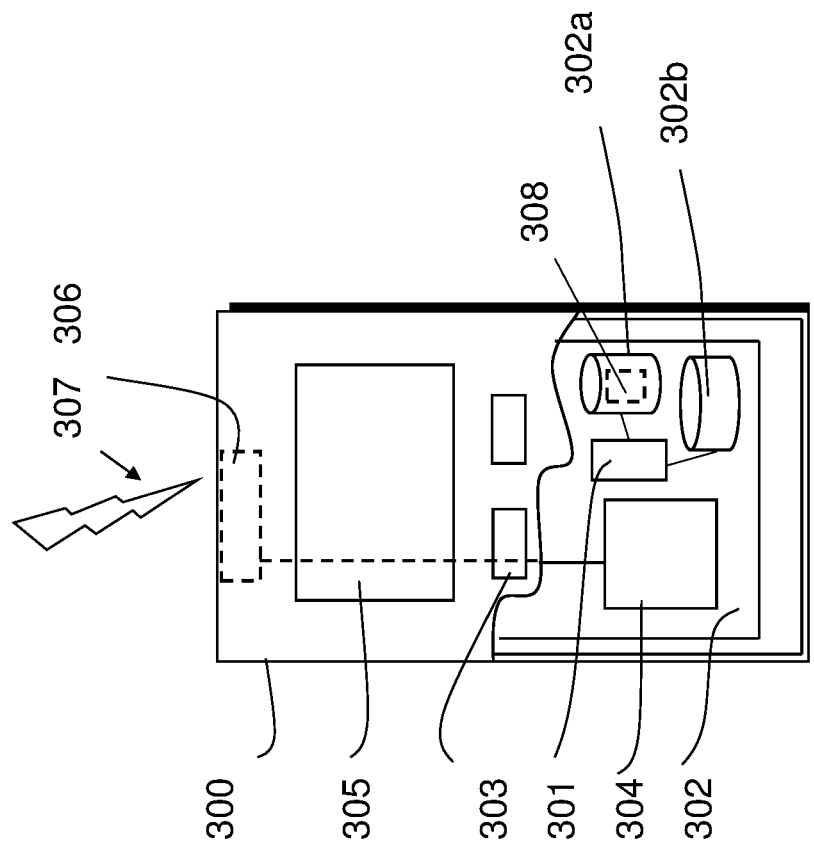
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dangle), a personal data assistant (PDA) or a tablet provided with wireless communication capabilities, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302b and the ROM 302a. The at least one processor 301 may be configured to execute an appropriate software code 308. The software code 308 may for example allow to perform one or more of the present aspects. The software code 308 may be stored in the ROM 302a.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

One or more aspect of this disclosure relates to communication between an initiating security edge protection proxy (SEPP) and a responding SEPP. 3GPP TS 33.501 V17.2.1 (section 5.9.3.2 requirements for security edge protection proxy) reads as follows:

"The SEPP shall act as a non-transparent proxy node.

The SEPP shall protect application layer control plane messages between two NFs belonging to different PLMNs that use the N32 interface to communicate with each other.

The SEPP shall perform mutual authentication and negotiation of cipher suites with the SEPP in the roaming network.

The SEPP shall handle key management aspects that involve setting up the required cryptographic keys needed for securing messages on the N32 interface between two SEPPs.

The SEPP shall perform topology hiding by limiting the internal topology information visible to external parties.

As a reverse proxy the SEPP shall provide a single point of access and control to internal NFs.

The receiving SEPP shall be able to verify whether the sending SEPP is authorized to use the PLMN ID in the received N32 message.

The SEPP shall be able to clearly differentiate between certificates used for authentication of peer SEPPs and certificates used for authentication of intermediates performing message modifications.

NOTE 1: Such a differentiation could be done e.g. by implementing separate certificate storages.

The SEPP shall discard malformed N32 signaling messages.

The sending SEPP shall reject messages received from the NF (directly or via SCP) with JSON including "encBlockIndex" (regardless of the encoding used for that JSON request).

The receiving SEPP shall reject any message in which an IPX has inserted or relocated references to encBlockIndex.

The SEPP shall implement rate-limiting functionalities to defend itself and subsequent NFs against excessive CP signaling. This includes SEPP-to-SEPP signaling messages.

The SEPP shall implement anti-spoofing mechanisms that enable cross-layer validation of source and destination address and identifiers (e.g. FQDNs or PLMN IDs).

NOTE 2: An example for such an anti-spoofing mechanism is the following: If there is a mismatch between different layers of the message or the destination address does not belong to the SEPP's own PLMN, the message is discarded.

The SEPP shall be able to use one or more PLMN IDs. In the situation that a PLMN is using more than one PLMN ID, this PLMN's SEPP may use the same N32-connection for all of the PLMN's PLMN IDs, with each of the PLMN's remote PLMN partners. If different PLMNs are represented by the PLMN IDs supported by a SEPP, the SEPP shall use separate N32-connections for each pair of home and visited PLMN".

In other words, an initiating SEPP and a responding SEPP may support one or more public land mobile network (PLMN)s. Each PLMN may be identified by one or more PLMN identifiers (IDs).

The initiating SEPP and the responding SEPP may establish a N32-connection between a PLMN supported by the initiating SEPP and a PLMN supported by a responding SEPP. When a PLMN supported by the initiating SEPP and/or the responding SEPP is identified by a plurality of PLMN IDs, the initiating SEPP and the responding SEPP may use the same N32-connection for the plurality PLMN IDs (as opposed to a separate N32-connection for each PLMN ID of the plurality PLMN IDs).

The initiating SEPP and the responding SEPP may establish separate N32-connections for each pair comprising a PLMN supported by the initiating SEPP and a PLMN supported by the responding SEPP.

3GPP TS 29.573 V17.1.0 (section 5.2.2 security capability negotiation procedure) reads as follows:

The initiating SEPP shall initiate a Security Capability Negotiation procedure towards the responding SEPP to agree on a security mechanism to use for protecting NF service related signalling over N32-f. An end to end TLS connection shall be setup between the SEPPs before the initiation of this procedure. The procedure is described in FIG. 5.2.2-1 of 3GPP TS 29.573 V17.1.0.

1. The initiating SEPP issues a HTTP POST request towards the responding SEPP with the request body containing the "SecNegotiateReqData" IE carrying the following information:

Supported security capabilities (i.e PRINS and/or TLS);
   Whether the 3gpp-Sbi-Target-apiRoot HTTP header is supported, if TLS security is supported;
   Sender PLMN ID(s).

2a. On successful processing of the request, the responding SEPP shall respond to the initiating SEPP with a "200 OK" status code and a POST response body that contains "SecNegotiateRspData" IE carrying the following information:

Selected security capability (i.e PRINS or TLS);
   Whether the 3gpp-Sbi-Target-apiRoot HTTP header is supported, if TLS security is selected;
   Sender PLMN ID(s).

The responding SEPP compares the initiating SEPP's supported security capabilities to its own supported security capabilities and selects, based on its local policy, a security mechanism, which is supported by both the SEPPs. If the selected security capability indicates any other capability other than PRINS, then the HTTP/2 connection initiated between the two SEPPs for the N32 handshake procedures shall be terminated. The negotiated security capability shall be applicable on both the directions. If the selected security capability is PRINS, then the two SEPPs may decide to create (if not available)/maintain HTTP/2 connection(s) where each SEPP acts as a client towards the other (which acts as a server). This may be used for later signalling of N32-f error reporting procedure (see clause 5.2.5) and N32-f context termination procedure (see clause 5.2.4).

2b. On failure, the responding SEPP shall respond to the initiating SEPP with an appropriate 4xx/5xx status code as specified in clause 6.1.4.2.

A shortcoming of 3GPP TS 29.573 V17.1.0 does not address scenarios where an initiating SEPP supports multiple PLMNs and each of the PLMNs supported by the initiating SEPP is identified by multiple PLMN IDs. At most, 3GPP TS 29.573 V17.1.0 addresses scenarios where an initiating SEPP supports multiple PLMNs and each PLMN supported by the initiating SEPP is identified by a single PLMN ID.

Let assume a communication system comprising an initiating SEPP1 and a responding SEPP2.

The initiating SEPP1 may support a PLMN for an operator A and a PLMN for a mobile virtual network operator B. The PLMN for the operator A may be identified by multiple PLMN IDs A1 and A2. The PLMN for the mobile virtual network operator B may be identified by a single PLMN ID B1.

The responding SEPP 2 may support PLMN for an operator C and a PLMN for a mobile virtual network operator D. The PLMN for the operator C may be identified by multiple PLMN IDs C1 and C2. The PLMN for the mobile virtual network operator D may be identified by a single PLMN ID D1.

Security capability negotiations may be performed individually for each pair comprising a PLMN supported by the initiating SEPP1 and a PLMN supported by the responding SEPP2.

In other words, a security capability negotiation may be performed for the pair comprising the PLMN for operator A supported by the initiating SEPP1 and the PLMN for operator C supported by the responding SEPP2.

A security capability negotiation may be performed for the pair comprising the PLMN for operator A supported by the initiating SEPP1 and the PLMN for mobile virtual network operator D supported by the responding SEPP2.

A security capability negotiation may be performed for the pair comprising the PLMN for mobile virtual network operator B supported by the initiating SEPP1 and the PLMN for operator C supported by the responding SEPP2.

A security capability negotiation may be performed for the pair comprising the PLMN for mobile virtual network operator B supported by the initiating SEPP1 and the PLMN for mobile virtual network operator D supported by the responding SEPP2.

Performing security capability negotiations individually for each pair comprising a PLMN supported by the initiating SEPP1 and a PLMN supported by the responding SEPP2 may not be possible via the security capability negotiation procedure discussed above. Indeed, the SecNegotiateReqData information element (IE) contains a plmnIdList(array PLMNID) attribute that does not differentiate PLMN IDs identifying different PLMNs. Likewise, the SecNegotiateRespData IE contains a plmnIdList(array PLMNID) attribute that does not differentiate PLMN IDs identifying different PLMNs.

Moreover, when a security capability negotiation may be performed for a pair comprising a PLMN supported by the initiating SEPP1 and a PLMN supported by the responding SEPP2, the security capability negotiation procedure discussed above does not allow the initiating SEPP1 to inform the responding SEPP2 about a target PLMN supported by the responding SEPP2 to be selected for the security capability negotiation. In this way, the responding SEPP2 would include the PLMN IDs identifying the target PLMN supported by the responding SEPP2 in the SecNegotiateRespData IE. The responding SEPP2 would not include the PLMN IDs identifying other PLMNs supported by the responding SEPP2 in the SecNegotiateRespData IE.

For example, a security capability negotiation may be performed for the pair comprising the PLMN for operator A supported by the initiating SEPP1 and the PLMN for operator C supported by the responding SEPP2, the security capability negotiation procedure discussed above does not allow the initiating SEPP1 to inform the responding SEPP2 about the PLMN for operator C supported by the responding SEPP2 to be selected for the Security capability negotiation. In this way, the responding SEPP2 would include the PLMN IDs identifying the PLMN for the operator C in the SecNegotiateRespData IE. The responding SEPP2 would not include the PLMN IDs identifying the PLMN for the mobile virtual network operator D in the SecNegotiateRespData IE.

One or more aspects of the disclosure provide techniques to allow an initiating SEPP to inform a responding SEPP about a target PLMN supported by the responding SEPP to be selected for the security capability negotiation.

In an implementation, an initiating SEPP may inform a responding SEPP about a target PLMN supported by the responding SEPP to be selected for the security capability negotiation by providing a PLMN ID identifying the target PLMN supported by the responding SEPP to be selected for the security capability negotiation in the security capability negotiation request. For example, the PLMN ID identifying the target PLMN supported by the responding SEPP to be selected for the security capability negotiation may be included in the SecNegotiateReqData IE.

In another implementation, an initiating SEPP may inform a responding SEPP about a target PLMN supported by the responding SEPP to be selected for the security capability negotiation by providing a fully qualified domain name (FQDN) in the security capability negotiation request, where the FQDN is specific to the target PLMN supported by the responding SEPP to be selected for the security capability negotiation.

Figure 4:
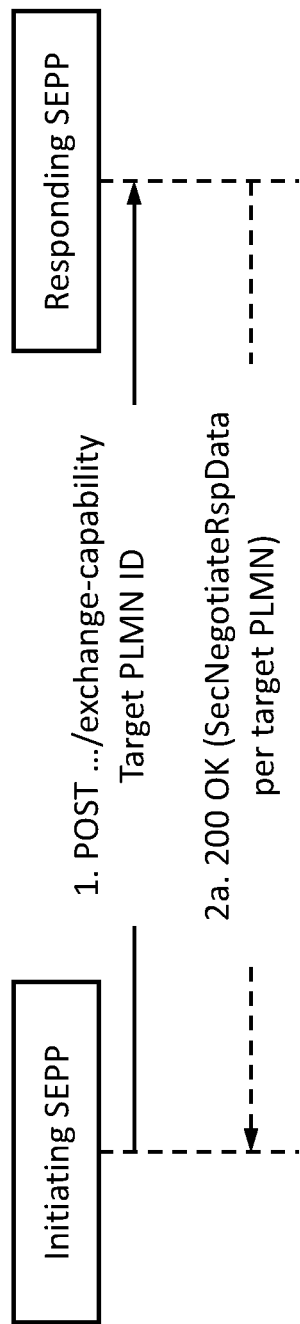
FIG. 4 shows an example of a block signaling diagram of a process for performing a security capability negotiation procedure between a first apparatus (e.g. initiating security edge protection proxy) and a second apparatus (e.g. responding security edge protection proxy) in a communication system (e.g. 5G system)

FIG. 4 shows an example of a block signaling diagram of a process for performing a security capability negotiation procedure between a first apparatus (e.g. initiating security edge protection proxy) and a second apparatus (e.g. responding security edge protection proxy) in a communication system (e.g. 5G system).

The initiating SEPP may initiate a security capability negotiation procedure towards the responding SEPP to agree on a security mechanism to use for protecting NF service related signalling over N32-f. An end to end transport layer security (TLS) connection shall be setup between the SEPPs before the initiation of this procedure.

In step 1 the initiating SEPP may send a security capability negotiation request (e.g. HTTP POST request) to the responding SEPP. The security capability negotiation request may comprise a request body. The request body may be containing the SecNegotiateReqData IE.

The SecNegotiateReqData IE may comprise information indicating supported security capabilities (e.g. protocol for N32 interconnected security (PRINS) and/or TLS).

The SecNegotiateReqData IE may comprise information indicating whether a 3gpp-Sbi-Target-apiRoot HTTP header is supported, if TLS security is supported.

The SecNegotiateReqData IE may comprise information indicating a list of PLMN IDs identifying a PLMN supported by the initiating SEPP (also referred as Sender PLMN IDs or PLMN ID List).

The SecNegotiateReqData IE may comprise information indicating a PLMN ID identifying a target PLMN supported by the responding SEPP to be selected for the security capability negotiation (also referred as Target PLMN ID).

The initiating SEPP and the responding SEPP may establish a N32-connection between a PLMN supported by the initiating SEPP and a PLMN supported by the responding SEPP. When a PLMN supported by the initiating SEPP and/or responding SEPP is identified by a plurality of PLMN IDs, the initiating SEPP and the responding SEPP may use the same N32-connection for the plurality of PLMN IDs (as opposed to a separate N32-connection for each PLMN ID of the plurality PLMN IDs).

The initiating SEPP and the responding SEPP may establish separate N32-connections for each pair comprising a PLMN supported by the initiating SEPP and a PLMN supported by the responding SEPP.

The responding SEPP may derive the target PLMN supported by the responding SEPP to be selected for the security capability negotiation based on the PLMN ID identifying a target PLMN supported by the responding SEPP to be selected for the security capability negotiation in the SecNegotiateReqData IE.

Additionally or alternatively, the initiating SEPP and/or the responding SEPP may be configured with different FQDNs specific to different PLMNs supported by the initiating SEPP and/or the responding SEPP. The responding SEPP may derive the target PLMN supported by the responding SEPP to be selected for the security capability negotiation based on a FQDN in the security capability negotiation request uniform resource indicator (URI) specific to the target PLMN supported by the responding SEPP to be selected for the security capability negotiation.

The table below provides a possible definition for the SecNegotiateReqData IE.

The SecNegotiateRspData IE may comprise information indicating a list of PLMN IDs identifying a PLMN ID supported by the responding SEPP (also referred as Sender PLMN IDs or PLMN ID List). Here, the SecNegotiateRspData IE may comprise information indicating a list of PLMN IDs identifying the target PLMN supported by the responding SEPP selected for security capability negotiation.

The responding SEPP may compare the initiating SEPP's supported security capabilities to its own supported security capabilities and select, based on its local policy, a security capability supported by both the initiating SEPP and the responding SEPP.

If the selected security capability indicates a capability other than PRINS, then HTTP/2 connections initiated between the initiating SEPP and the responding SEPP for N32 handshake procedures may be terminated.

The selected security capability may be applicable on both the directions. If the selected security capability is PRINS, then the initiating SEPP and the responding SEPP may decide to create (if not available) or maintain (if available) HTTP/2 connections initiated between the initiating SEPP and the responding SEPP for N32 handshake procedures. Each SEPP may act as a client towards the other

| Attribute name | Data type | P | Cardinality | Description |
| --- | --- | --- | --- | --- |
| sender | Fqdn | M | 1 | This IE may uniquely identify the SEPP that is sending the request. This IE is used to store the negotiated security capability against the right SEPP. |
| supportedSecCapabilityList | array(SecurityCapability) | M | 1 . . . N | This IE may contain the list of security capabilities that the requesting SEPP supports. |
| 3GppSbiTargetApiRootSupported | boolean | C | 0 . . . 1 | This IE may be present and indicate that the 3gpp-Sbi-Target-apiRoot HTTP header is supported, if TLS security is supported for N32f message forwarding. When present, it may indicate if TLS security using the 3gpp-Sbi-Target-apiRoot HTTP header is supported: true: supported false (default): not supported |
| plmnIdList | array(PlmnId) | O | 1 . . . N | A list of PLMN IDs identifying a PLMN associated with the SEPP, which is sending the request. The list to be stored by the receiving SEPP in a N32-f Context. |
| targetPlmnId | PlmnId | O | 1 | When present, this IE may indicate a PLMN ID identifying a PLMN supported by the receiving SEPP for which the N32-c connection is requested to be established. |

In step 2a, on successful processing of the security capability negotiation request, the responding SEPP may send a response to the initiating SEPP. The response may comprise a "200 OK" status code. The response may comprise a response body. The response body may contain the SecNegotiateRspData IE.

The SecNegotiateRspData IE may comprise information indicating a selected security capability (e.g. PRINS and/or TLS).

The SecNegotiateRspData IE may comprise information indicating whether the 3gpp-Sbi-Target-api Root HTTP header is supported, if TLS security is selected.

(which acts as a server). This may be used for later signalling of N32-f error reporting procedure and N32-f context termination procedure.

The responding SEPP may establish a N32-connection between a PLMN supported by the responding SEPP and a PLMN supported by the initiating SEPP. When a PLMN supported by the responding SEPP is identified by a plurality of PLMN IDs, the responding SEPP may use the same N32-connection for the plurality of PLMN IDs (as opposed to a separate N32-connection for each PLMN ID of the plurality PLMN IDs).

The table below provides a possible definition for the SecNegotiateRespData IE.

| Attribute name | Data type | P | Cardinality | Description |
| --- | --- | --- | --- | --- |
| sender | Fqdn | M | 1 | This IE may uniquely identify the SEPP that is sending the response. This IE is used to store the negotiated security capability against the right SEPP. |
| selectedSecCapability | SecurityCapability | M | 1 | This IE may contain the security capability selected by the responding SEPP. |
| 3GppSbiTargetApiRootSupported | boolean | C | 0 . . . 1 | This IE may be present and indicate that the 3gpp-Sbi-Target-apiRoot HTTP header is supported, if TLS security is negotiated for N32f message forwarding and the initiating SEPP indicated support of this header. When present, it shall indicate if TLS security using the 3gpp-Sbi-Target-apiRoot HTTP header is supported: true: supported false (default): not supported |
| plmnIdList | array(PlmnId) | O | 1 . . . N | A list of PLMN IDs identifying a PLMN associated with the SEPP, which is sending the response. The list to be stored by the receiving SEPP in a N32-f Context (see clause 5.9.3 in 3GPP TS 33.501 [6]). |

In step 2b, on failure of the security capability negotiation request, the responding SEPP may send a response to the initiating SEPP. The response may comprise a "4xx/5xx status code" status code.

Figure 5:
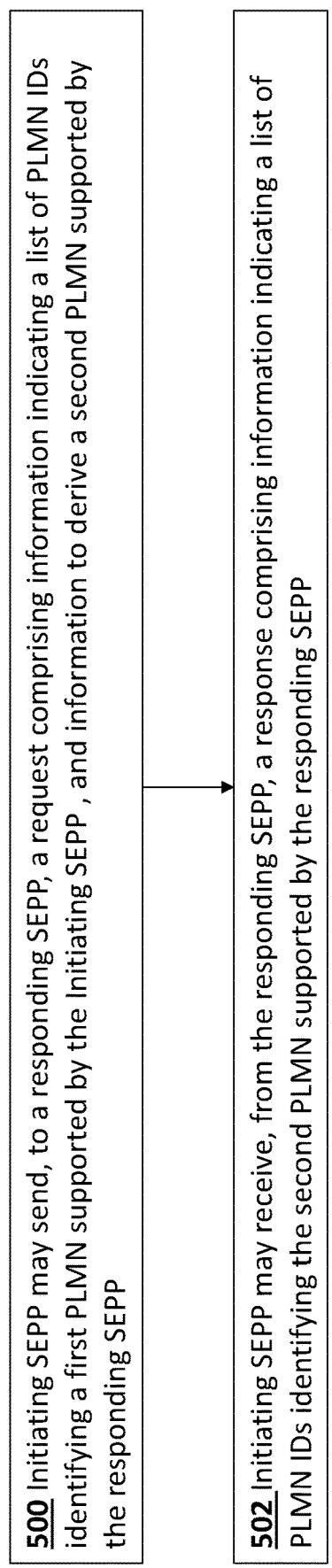
FIG. 5 shows a block diagram of a method for communicating between a first apparatus (e.g. initiating security edge protection proxy) and a second apparatus (e.g. responding security edge protection proxy) in a communication system (e.g. 5G system) performed by the first apparatus.

FIG. 5 shows a block diagram of a method for communicating between a first apparatus (e.g. initiating SEPP) and a second apparatus (e.g. responding SEPP) in a communication system (e.g. 5G system) performed by the first apparatus.

In step 500, an initiating SEPP may send, to a responding SEPP, a request comprising information indicating a list of PLMN IDs identifying a first PLMN supported by the initiating SEPP, and information to derive a second PLMN supported by the responding SEPP.

In step 502, the initiating SEPP may receive, from the responding SEPP, a response comprising information indicating a list of PLMN IDs identifying the second PLMN supported by the responding SEPP.

The information to derive the second PLMN supported by the responding SEPP may comprise a PLMN ID identifying the second PLMN supported by the responding SEPP.

The information to derive the second PLMN supported by the responding SEPP may be conveyed via a IE in the request.

The IE may be a SecNegotiateReqData IE.

The information to derive the second PLMN supported by the responding SEPP may be conveyed a FQDN associated with the second PLMN supported by the responding SEPP.

The information indicating the list of PLMN IDs identifying the second PLMN supported by the responding SEPP may be conveyed via a IE in the response.

The IE may be a SecNegotiateRespData IE.

The initiating SEPP may support a first plurality of PLMNs comprising the first PLMN and the responding SEPP may support a second plurality of PLMNs comprising the second PLMN.

The initiating SEPP may establish a connection between the first PLMN supported by the initiating SEPP and the second PLMN supported by the responding SEPP separate from another connection between another first PLMN supported by the initiating SEPP and another second PLMN supported by the responding SEPP and/or separate from another connection between another first PLMN supported by the initiating SEPP and the second PLMN supported by the responding SEPP.

The connection between the initiating SEPP and the responding SEPP may be a signalling connection to exchange security and protection policies, to be used for the forwarding of service requests and responses between the first PLMN and the second PLMN.

Figure 6:
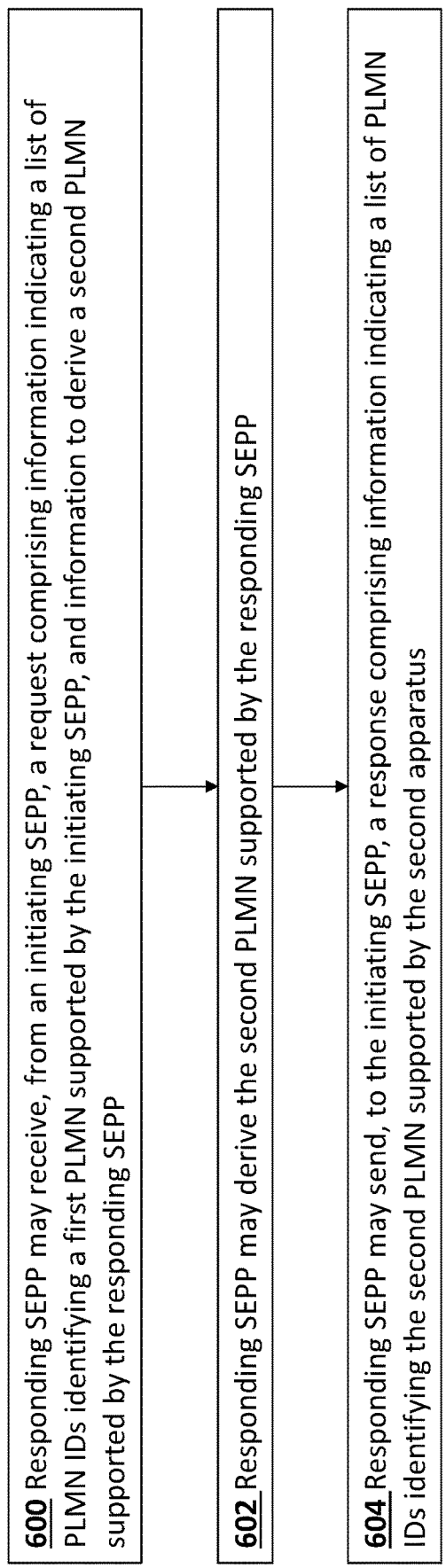
FIG. 6 shows a block diagram of a method for communicating between a first apparatus (e.g. initiating security edge protection proxy) and a second apparatus (e.g. responding security edge protection proxy) in a communication system (e.g. 5G system) performed by the first apparatus performed by the second apparatus.

FIG. 6 shows a block diagram of a method for communicating between a first apparatus (e.g. initiating security edge protection proxy) and a second apparatus (e.g. responding security edge protection proxy) in a communication system (e.g. 5G system) performed by the second apparatus.

In step 600, a responding SEPP may receive, from an initiating SEPP, a request comprising information indicating a list of PLMN IDs identifying a first PLMN supported by the initiating SEPP, and information to derive a second PLMN supported by the responding SEPP.

In step 602, the responding SEPP may derive the second PLMN supported by the responding SEPP.

In step 603, the responding SEPP may send, to the initiating SEPP, a response comprising information indicating a list of PLMN IDs identifying the second PLMN supported by the responding SEPP.

The information to derive the second PLMN supported by the responding SEPP may comprise a PLMN ID identifying the second PLMN supported by the responding SEPP.

The information to derive the second PLMN supported by the responding SEPP may be conveyed via a IE in the request.

The IE may be a SecNegotiateReqData IE.

The information indicating the second PLMN supported by the responding SEPP may comprise a FQDN associated with the second PLMN supported by the responding SEPP.

The information indicating the list of PLMN IDs identifying the second PLMN supported by the responding SEPP may be conveyed via a IE in the response.

The IE may be a SecNegotiateRespData information element.

The initiating SEPP may support a first plurality of PLMNs comprising the first PLMN and the responding SEPP may support a second PLMNs comprising the second PLMN.

The responding SEPP may establish a connection between the first PLMN supported by the initiating SEPP and the second PLMN supported by the responding SEPP separate from another connection between the first PLMN supported by the initiating SEPP and another second PLMN supported by the responding SEPP and/or separate from another connection between another first PLMN supported by the initiating SEPP and the second PLMN supported by the responding SEPP.

The connection between the initiating SEPP and the responding SEPP may be a signalling connection to exchange security and protection policies, to be used for the forwarding of service requests and responses between the first PLMN and the second PLMN.

Figure 7:
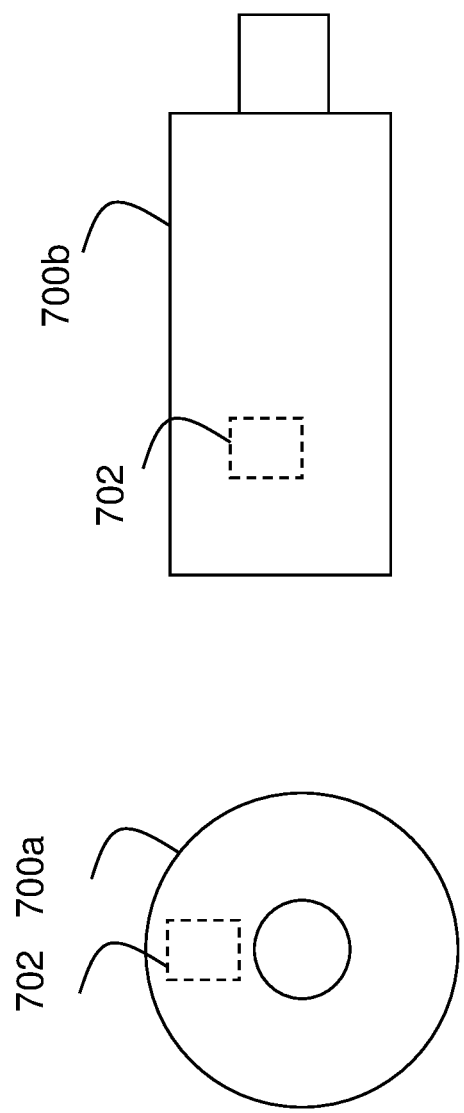
FIG. 7 shows a schematic representation of a non-volatile memory medium storing instructions which when executed by a processor allow a processor to perform one or more of the steps of the methods of FIGS. 5 and 6.

FIG. 7 shows a schematic representation of non-volatile memory media 700*a* (e.g. computer disc (CD) or digital versatile disc (DVD)) and 700*b* (e.g. universal serial bus (USB) memory stick) storing instructions and/or parameters 702 which when executed by a processor allow the processor to perform one or more of the steps of the methods of FIGS. 5 and 6.

It is noted that while the above describes example embodiments, there are several variations and modifications which may be made to the disclosed solution without departing from the scope of the present invention.

It will be understood that although the above concepts have been discussed in the context of a 5GS, one or more of these concepts may be applied to other cellular systems.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 5 and 6, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
(a) hardware-only circuit implementations (such as implementations in only analogue and/or digital circuitry);
(b) combinations of hardware circuits and software, such as:
 (i) a combination of analogue and/or digital hardware circuit(s) with software/firmware and
 (ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. A first security edge protection proxy node comprising: at least one processor and at least one memory storing computer code the computer code being configured, when executed by the at least one processor, to cause the first security edge proxy node at least to perform:
sending, to a second security edge protection proxy node a security capability negotiation request, the security capability negotiation request comprising a target public land mobile network identifier, and a first list of public land mobile network identifiers, wherein the first list comprises a first public land mobile network identifier identifying a first public land mobile network supported by the first security edge proxy node and a second public land mobile network identifier identifying a second public land mobile network supported by the first security edge proxy, wherein the first public land mobile network and the second public mobile network are different public land mobile networks;
receiving, from the second security edge protection proxy node, a response to the security capability negotiation request, the response comprising a second list of public land mobile network identifiers, wherein each respective public land mobile identifier in the second list identifies a public land mobile network supported by the second apparatus security edge protection proxy node; and establishing a N32 connection between the first public land mobile network supported by the first security edge protection proxy node and the public land mobile network supported by the second security edge protection proxy node separate from another N32 connection between the second public land mobile network supported by the first security edge protection proxy node and the public land mobile network supported by the second security edge protection proxy node.

2. The first security edge protection proxy node of claim 1, wherein the security capability negotiation request comprises an information element, and wherein the information element comprises the target public land mobile network identifier and the first list of public land mobile network identifiers.

3. The first security edge protection proxy of claim 2, wherein the information element is a SecNegotiateReqData information element.

4. The first security edge protection proxy node of claim 1, wherein the response comprises a SecNegotiateRespData information element, and wherein the SecNegotiateRespData information element the second list of public land mobile network identifiers.

5. The first security edge protection proxy node of claim 1, wherein the first security edge protection proxy is an initiating security edge protection proxy and the second security edge protection proxy is a responding security edge protection proxy.

6. The first security edge protection proxy node of claim 1, wherein the connection established between the first security edge protection proxy and the second security edge protection proxy is a signalling connection to be used to exchange security and protection policies, and to be used for forwarding of service requests and responses between the first public land mobile network and the second public land mobile network.

7. A second security edge protection proxy comprising; at least one processor; and at least one memory storing computer code, the computer code being configured, when executed by the at least one processor, to cause the second at least to perform:
  receiving, from a first security edge protection proxy, a security capability negotiation request, the security capability negotiation reques comprising a target public land mobile identifier and a first list of public land mobile network identifiers, wherein the first list comprises a first public land mobile identifier identifying a first public land mobile network supported by the first security edge protection proxy and a second public land mobile identifier identifying a second public land mobile network supported by the first security edge protection proxy, wherein the first public land mobile network and the second public mobile network are different public land mobile networks;
  selecting a public land mobile network supported by the second security edge protection proxy based on the target public land mobile network identifier; and
  sending, to the first security edge protection proxy node, a response to the security capability negotiation request, the response comprising a second list of public land mobile network identifiers, wherein each respective public land mobile identifier in the second list identifies the public land mobile network supported by the second security edge protection proxy node that is selected; and
  establishing a N32 connection between the first public land mobile network supported by the first security edge protection proxy node and the public land mobile network supported by the second security edge protection proxy node separate from another N32 connection between the second public land mobile network supported by the first security edge protection proxy node and the public land mobile network supported by the second security edge protection proxy node.

8. The second security edge protection proxy of claim 7, wherein the security comprises an information element and wherein the information element comprises the first list of public land mobile network identifiers and the second public land mobile network identifier identifying the second public land mobile network supported by the second security edge protection proxy node.

9. The second security edge protection proxy of claim 8, wherein the information element is a SecNegotiateReqData information element.

10. The second apparatus of claim 7, wherein the the response comprises a SecNegotiateRespData information element, and wherein the SecNegotiateRespData information element comprises.

11. The second apparatus of claim 7, wherein the connection between the first apparatus and the second apparatus is a signalling connection to be used to exchange security and protection policies, to be used for forwarding of service requests and responses between the first public land mobile network and the second public land mobile network.

12. A method for a first security edge protection proxy, the method comprising:
  sending, to a second security edge protection proxy, a security capability negotiation request, the security capability negotiation request comprising a target public land mobile network identifier and a first list of public land mobile network identifiers, wherein the first list comprise a first public land mobile network identifier identifying a first public land mobile network supported by the first security edge protection proxy and a second public land mobile identifier identifying a second public land mobile network supported by the first security edge protection proxy, wherein the first public land mobile network and the second public mobile network are different public land mobile networks; and
  receiving, from the second security edge protection proxy, a response to the security capability negotiation request, the response comprising a second list of public land mobile network identifiers, wherein each respective public land mobile network identifier in the second list identifies a public land mobile network supported by the second security edge protection proxy;
  establishing a N32 connection between the first public land mobile network supported by the first security edge protection proxy node and the public land mobile network supported by the second security edge protection proxy node separate from another N32 connection between the second public land mobile network supported by the first security edge protection proxy node and the public land mobile network supported by the second security edge protection proxy node.

13. The method of claim 12, wherein the request comprises an information element, and wherein the information element comprises the target public land mobile network identifier and the first list of public land mobile network identifiers.

14. The method of claim 13, wherein the information element is a SecNegotiateReqData information element.

15. The method of claim 12, wherein the response comprises a SecNegotiateRespData information element, and wherein the SecNegotiateRespData information element the second list of public land mobile network identifiers.

16. The method of claim 12, wherein the first security edge protection proxy is an initiating security edge protection proxy and the second security edge protection proxy is a responding security edge protection proxy.

17. The method of claim 12, wherein the connection established between the first security edge protection proxy and the second security edge protection proxy is a signalling connection to be used to exchange security and protection policies, and to be used for forwarding of service requests and responses between the first public land mobile network and the second public land mobile network.

\* \* \* \* \*